United States Patent
Adam et al.

(10) Patent No.: US 12,401,690 B2
(45) Date of Patent: Aug. 26, 2025

(54) MECHANISM FOR DYNAMIC AUTHORIZATION

(71) Applicant: Nokia Technologies Oy, Espoo (FI)

(72) Inventors: Iris Adam, Munich (DE); Jing Ping, Chengdu (CN); Konstantinos Samdanis, Munich (DE); Chaitanya Aggarwal, Munich (DE); Anja Jerichow, Grafing bei Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 274 days.

(21) Appl. No.: 18/246,707

(22) PCT Filed: Oct. 9, 2020

(86) PCT No.: PCT/CN2020/120042
§ 371 (c)(1),
(2) Date: Mar. 27, 2023

(87) PCT Pub. No.: WO2022/073213
PCT Pub. Date: Apr. 14, 2022

(65) Prior Publication Data
US 2023/0362199 A1    Nov. 9, 2023

(51) Int. Cl.
*H04L 9/40* (2022.01)
*H04W 12/08* (2021.01)

(52) U.S. Cl.
CPC ............ *H04L 63/20* (2013.01); *H04L 63/102* (2013.01); *H04W 12/08* (2013.01)

(58) Field of Classification Search
CPC ............................. H04L 63/20; H04L 63/102
(Continued)

(56) References Cited

U.S. PATENT DOCUMENTS

| 10,117,097 B1 | 10/2018 | Kotara et al. |
| 2010/0198698 A1 | 8/2010 | Raleigh et al. |

(Continued)

FOREIGN PATENT DOCUMENTS

| CN | 105659558 A | 6/2016 |
| CN | 109587187 A | 4/2019 |
| CN | 110366159 A | 10/2019 |
| CN | 111345052 A | 6/2020 |
| CN | 111416827 A | 7/2020 |
| EP | 2384040 A1 | 11/2011 |

(Continued)

OTHER PUBLICATIONS

Office action received for corresponding Chinese Patent Application No. 202080106039.5, dated Apr. 25, 2024, 15 pages of office action and no page of translation available.

(Continued)

*Primary Examiner* — Anthony D Brown
(74) *Attorney, Agent, or Firm* — Carter, DeLuca & Farrell LLP

(57) ABSTRACT

Example embodiments of the present disclosure relate to dynamic authorization. According to embodiments of the present disclosure, a solution for dynamic access control to data is proposed. On receiving data registration from a data source, a first device checks the data types to be produced by the data source and adds policies for the data or updates existing policies for the data according to its property. It also serves as access control decision point to determine consumers' access rights based on centrally managed policies. Authorization for data access is granted/denied according to local attributes/policies. In this way, it achieves a dynamic, context-aware and risk-intelligent access control to different kind of data from various data sources (i.e., service producers).

1 Claim, 11 Drawing Sheets

(58) Field of Classification Search
USPC .............................................................. 726/1
See application file for complete search history.

(56) References Cited

U.S. PATENT DOCUMENTS

| | | | |
|---|---|---|---|
| 2013/0086657 | A1 | 4/2013 | Srinivasan et al. |
| 2017/0063931 | A1 | 3/2017 | Seed et al. |
| 2018/0013747 | A1* | 1/2018 | Marshall ................. H04L 63/08 |
| 2019/0150017 | A1 | 5/2019 | Yao et al. |
| 2019/0222489 | A1 | 7/2019 | Shan |
| 2019/0230556 | A1 | 7/2019 | Lee |
| 2019/0253894 | A1 | 8/2019 | Bykampadi et al. |
| 2019/0394279 | A1 | 12/2019 | Dao et al. |
| 2020/0112841 | A1 | 4/2020 | Kim et al. |
| 2020/0137552 | A1 | 4/2020 | Park et al. |
| 2020/0196169 | A1 | 6/2020 | Dao et al. |

FOREIGN PATENT DOCUMENTS

| | | |
|---|---|---|
| WO | 2020/092914 A1 | 5/2020 |
| WO | 2020/141355 A1 | 7/2020 |
| WO | 2020/174121 A1 | 9/2020 |

OTHER PUBLICATIONS

"Clarification on service authorization and token verification", 3GPP TSG-SA WG3 Meeting #94, S3-190440, Huawei, Jan. 28-Feb. 1, 2019, 8 pages.

"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.

"3rd Generation Partnership Project; Technical Specification Group Services and System Aspects; Security architecture and procedures for 5G system (Release 16)", 3GPP TS 33.501, V16.3.0, Jul. 2020, pp. 1-248.

"3rd Generation Partnership Project; Technical Specification Group Core Network and Terminals; 5G System; Network Data Analytics Services; Stage 3 (Release 16)", 3GPP TS 29.520, V16.3.0, Mar. 2020, pp. 1-83.

Hardt, "The OAuth 2.0 Authorization Framework", RFC 6749, Internet Engineering Task Force (IETF), Oct. 2012, pp. 1-76.

"KI #1 #2 #11, New Solution: Data Collection and Sharing Architecture", SA WG2 Meeting #139E, S2-2004526, Agenda Item: 8.1, Nokia, Jun. 1-12, 2020, pp. 1-9.

Moradi et al., "SoftBox: A Customizable, Low-Latency, and Scalable 5G Core Network Architecture", IEEE Journal on Selected Areas in Communications, vol. 36, No. 3, Mar. 2018, pp. 438-456.

"IEEE 802.11", Wikipedia, Retrieved on Apr. 21, 2023, Webpage available at : https://en.wikipedia.org/wiki/IEEE_802.11.

International Search Report and Written Opinion received for corresponding Patent Cooperation Treaty Application No. PCT/CN2020/120042, dated Jul. 9, 2021, 9 pages.

"Service Based Architecture in IMS", 3GPP TSG-CT WG1 Meeting#120, C1-196154, Nokia, Oct. 7-11, 2019, pp. 1-38.

* cited by examiner

MECHANISM FOR DYNAMIC AUTHORIZATION

RELATED APPLICATION

This application was originally filed as PCT Application No. PCT/CN2020/120042, filed on Oct. 9, 2020, which is incorporated herein by reference in its entirety.

FIELD

Embodiments of the present disclosure generally relate to the field of telecommunication and in particular, to methods, devices, apparatuses and computer readable storage medium for dynamic authorization.

BACKGROUND

In recent communication networks, several new technologies have been proposed. For example, a fifth generation (5G) system architecture which is service based architecture has been proposed. The system functionality in the system architecture is achieved by a set of network functions (NF) providing services to other authorized NFs to access their services. A NF service is one type of capability exposed by a NF service producer to other authorized NF service consumers through a service based interface. A NF service may support one or more NF service operation(s). A service consumer needs to be authorized to access the service/data for the purpose of security.

SUMMARY

In general, example embodiments of the present disclosure provide a solution for dynamic authorization.

In a first aspect, there is provided a first device. The first device comprises at least one processor; and at least one memory including computer program codes; the at least one memory and the computer program codes are configured to, with the at least one processor, cause the first device to receive from a second device or a third device an authorization request for authorizing a fourth device to access at least one of: a data service or data provided by the third device, the authorization request at least indicating an identity of the fourth device. The first device is also caused to obtain a profile of the fourth device based on the identity of the fourth device. The first device is further caused to determine, based on the profile of the fourth device and an authorization policy of the data or the data service, authorization information of the fourth device. The first device is yet caused to transmit to the second device or the third device authorization information of the fourth device generated based on the determination.

In a second aspect, there is provided a second device. The second device comprises at least one processor; and at least one memory including computer program codes; the at least one memory and the computer program codes are configured to, with the at least one processor, cause the second device to receive, from a fourth device, a token request for accessing a data service. The second device is further caused to transmit to a first device an authorization request for authorizing the fourth device to access the data service, the authorization request at least indicating an identity of the fourth device. The second device is also caused to receive from the first device authorization information of the fourth device. The second device is yet caused to transmit a response to the token request to the fourth device.

In a third aspect, there is provided a third device. The third device comprises at least one processor; and at least one memory including computer program codes; the at least one memory and the computer program codes are configured to, with the at least one processor, cause the third device to receive, from a fourth device, a service request comprising a token for accessing at least one of: a data service or data provided by the third device. The third device is also caused to transmit to a first device an authorization request for authorizing the fourth device to access the data service or the data, the authorization request at least indicating an identity of the fourth device. The third device is further caused to receive from the first device authorization information of the fourth device. The third device is yet caused to transmit to the fourth device a service response generated based on the authorization information.

In a fourth aspect, there is provided a method. The method comprises receiving, at a first device and from a second device or a third device, an authorization request for authorizing a fourth device to access at least one of: a data service or data provided by the third device, the authorization request at least indicating an identity of the fourth device. The method also comprises obtaining a profile of the fourth device based on the identity of the fourth device. The method further comprises determining, based on the profile of the fourth device and an authorization policy of the data service or the data, authorization information of the fourth device. The method yet comprises transmitting to the second device or the third device authorization information of the fourth device generated based on the determination.

In a fifth aspect, there is provided a method. The method comprises receiving, at a second device and from a fourth device, a token request for accessing a data service. The method also comprises transmitting to a first device an authorization request for authorizing the fourth device to access the data service, the authorization request at least indicating an identity of the fourth device. The method further comprises receiving from the first device authorization information of the fourth device. The method yet comprises transmitting a response to the token request to the fourth device.

In a sixth aspect, there is provided a method. The method comprises receiving, at a third device and from a fourth device, a service request comprising a token for accessing at least one of: a data service or data provided by the third device. The method also comprises transmitting to a first device an authorization request for authorizing the fourth device to access the data service or the data, the authorization request at least indicating an identity of the fourth device. The method further comprises receiving from the first device authorization information of the fourth device. The method yet comprises transmitting to the fourth device a service response generated based on the authorization information.

In a seventh aspect, there is provided an apparatus. The apparatus comprises means for receiving, at a first device and from a second device or a third device, an authorization request for authorizing a fourth device to access at least one of: a data service or data provided by the third device, the authorization request at least indicating an identity of the fourth device; means for obtaining a profile of the fourth device based on the identity of the fourth device; means for determining, based on the profile of the fourth device and an authorization policy of the data service or the data, authorization information of the fourth device; and means for transmitting to the second device or the third device authorization information of the fourth device generated based on the determination.

In an eighth aspect, there is provided an apparatus. The apparatus comprises means for receiving, at a second device and from a fourth device, a token request for accessing a data service; means for transmitting to a first device an authorization request for authorizing the fourth device to access the data service, the authorization request at least indicating an identity of the fourth device; means for receiving from the first device authorization information of the fourth device; and means for transmitting a response to the token request to the fourth device.

In a ninth aspect, there is provided an apparatus. The apparatus comprises means for receiving, at a third device and from a fourth device, a service request comprising a token for accessing at least one of: a data service or data provided by the third device; means for transmitting to a first device an authorization request for authorizing the fourth device to access the data service or the data, the authorization request at least indicating an identity of the fourth device; means for receiving from the first device authorization information of the fourth device; and means for transmitting to the fourth device a service response generated based on the authorization information.

In a ten aspect, there is provided a computer readable medium. The computer readable medium comprises program instructions for causing an apparatus to perform at least the method according to any one of the above fourth, fifth or sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
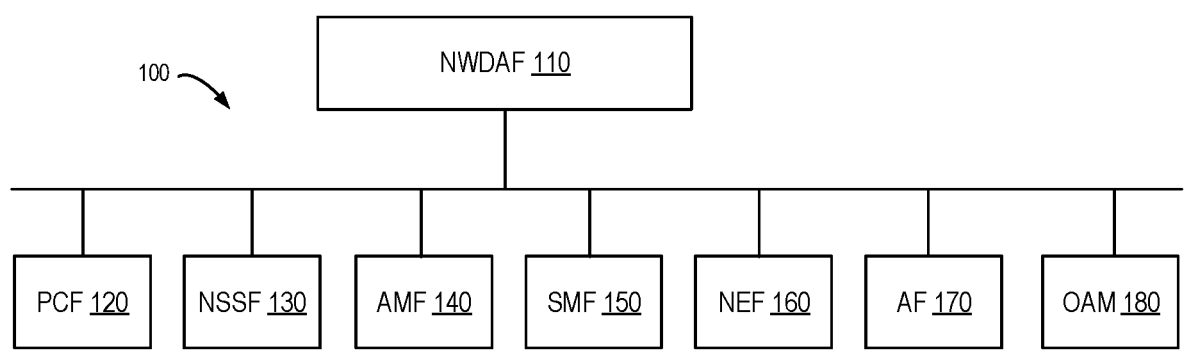
FIG. 1 illustrates a reference architecture for network data analytics function according to conventional technologies.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the service based architecture has been proposed. FIG. 1 illustrates reference architecture 100 for network data analytics function (NWDAF) according to conventional technologies. As shown in FIG. 1, the Nnwdaf_EventsSubscription service and the NWDAF_AnalyticsInfo Request service are part of the Nnwdaf service-based interface exhibited by the Network Data Analytics Function (NWDAF) 110. Known consumers of the Nnwdaf_EventsSubscription service and the NWDAF_AnalyticsInfo Request service may be: (1) a Policy Control Function (PCF) entity 120 which supports taking input from NWDAF into consideration for policies on assignment of network resources and for traffic steering policies, supports (un)subscription to analytics information for background data transfer from NWDAF to determine whether the negotiated transfer policy is impacted and supports taking analytics information for QoS sustainability from NWDAF into consideration of QoS policies; (2) a Network Slice Selection Function (NSSF) entity 130 which supports taking load level information from NWDAF into consideration for slice selection; (3) an Access and Mobility Management Function (AMF) entity 140 which supports taking SMF load information from NWDAF into consideration for SMF selection; (4) a Session Management Function (SMF) entity 150 which supports taking UPF load information from NWDAF into consideration for UPF selection; (5) a Network Exposure Function (NEF) entity 160 which supports forwarding UE mobility information from NWDAF to the AF when it is untrusted, supports forwarding UE communication information from NWDAF to the AF when it is untrusted and supports forwarding user data congestion information from NWDAF to the AF when it is untrusted; (6) an Application Function (AF) entity 170 which supports receiving UE mobility information from NWDAF or via the NEF, supports receiving UE communication information from NWDAF or via the NEF, and supports receiving user data congestion information from NWDAF or via the NEF; and (7) an Operation, Administration, and Maintenance (OAM) entity 180 which supports receiving observed service experience from NWDAF.

The PCF accesses the Nnwdaf_EventsSubscription service at the NWDAF via the N23 Reference point. The NSSF accesses the Nnwdaf_EventsSubscription service at the NWDAF via the N34 Reference point. The Network Data Analytics Function (NWDAF) service may provide analytics information for different analytic events to NF consumers. The Network Data Analytics Function (NWDAF) allows NF consumers to subscribe to and unsubscribe from periodic notification and/or notification when an event is detected.

A NF service is one type of capability exposed by a NF which is an NF Service Producer to other authorized NF which is an NF Service Consumer through a service based interface. A NF service may support one or more NF service operation(s). NFs may offer different functionalities and thus different NF services. Each of the NF services offered by a NF shall be self-contained, acted upon and managed independently from other NF services offered by the same NF (for example, for scaling, healing). A Control Plane NF within the 5G Core network may expose its capabilities as services via its service based interface, which can be re-used by Control Plane Core Network (CN) NFs.

The NF service discovery enables a CN NFs to discover NF instance(s) that provide the expected NF service(s). Generally, the Network Repository Function (NRF) supports the following functionality:

Receives NF Discovery Request from NF instance, and provides the information of the discovered NF instances (be discovered) to the NF instance;

Maintains the NF profile of available NF instances and their supported services.

For the NRF to properly maintain the information of available NF instances and their supported services, each NF instance informs the NRF of the list of NF services that it supports. In the new 5G Services Based Architecture (SBA), once a NF registers its services with the NRF, it then simply exposes services that any authorized consumer can consume, rather than having to define a new point-to-point interface and the procedures between the two network functions as requiring. This offers greater flexibility and more efficiency by decoupling the service consumer from the service producer.

Figure 2:
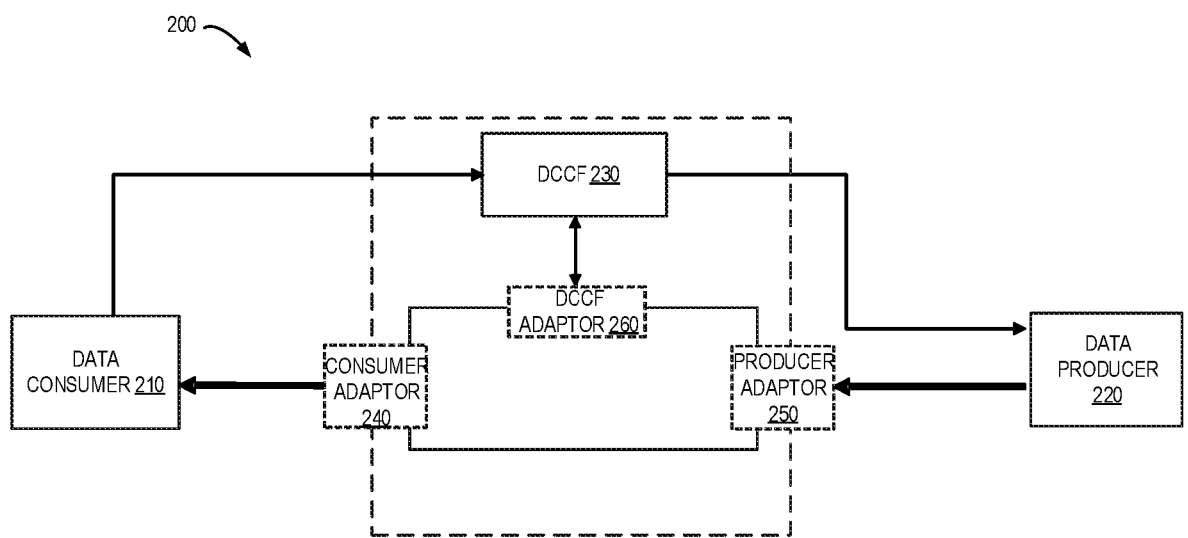
FIG. 2 illustrates a data management framework according to conventional technologies.

FIG. 2 illustrates a data management framework 200 according to conventional technologies. The data management framework 200 may comprise a data consumer 210, a data producer 220, a Data Collection Coordination Function (DCFF) entity 230, a consumer adaptor 240, a producer adaptor 250, and a DCFF adaptor 260. It should be noted that the data management framework may comprise other entities (for example, a data repository) which are omitted for the purpose of clarity. The data management framework may automate the process of data collection from different data producers 220 (sources) and distribution among different data consumers 210. The Data Collection Coordination Function (DCFF) is a control plane function to coordinate the data collection and to trigger the data delivery to consumers. The consumer adaptor 240 and the producer adaptor 250 may isolate message bus protocol from the data consumer 210 and the data producer 220. The authorization for consumers of analytics data/information from analytic services is addressed with limited scope. For example, it raises the need to authorize consumers of the data management framework but no solution is defined.

Future networks will be more heterogeneous, dynamic and scalable e.g., 5G network slices customized for specific services. Access control solutions for analytics services should consider various data sources and data consumers as well as should establish and adapt to changing trust relationship between data (service) consumers and data (service) producers. Information/data consumers of analytics services could be e.g., management functions, network functions, applications, and other external entities from different administrative/security domains (e.g., different slice/slice subnet). Data (service) producer could provide different types of data e.g., UE data, service experience data, NF data. Furthermore, it could be required to classify data according to its sensitivity to be compliant with privacy regulations and security policies from data consumers like organizations. Thus, an authorization mechanism for data (service) consumer should support fine-grained authorization solutions like attribute-based access control (ABAC). So far, the authorization procedure does not include any property or classification of data from different sources (service producers) provided to NFs like NWDAF, applications or other external entities.

According to embodiments of the present disclosure, a solution for dynamic access control to data is proposed. On receiving data registration from a data source, a first device checks the data types to be produced by the data source and adds policies for the data or updates existing policies for the data according to its property. It also serves as access control decision point to determine consumers' access rights based on centrally managed policies. Authorization for data access is granted/denied according to local attributes/policies. In this way, it achieves a dynamic, context-aware and risk-intelligent access control to different kind of data from various data sources (service producers).

Figure 3:
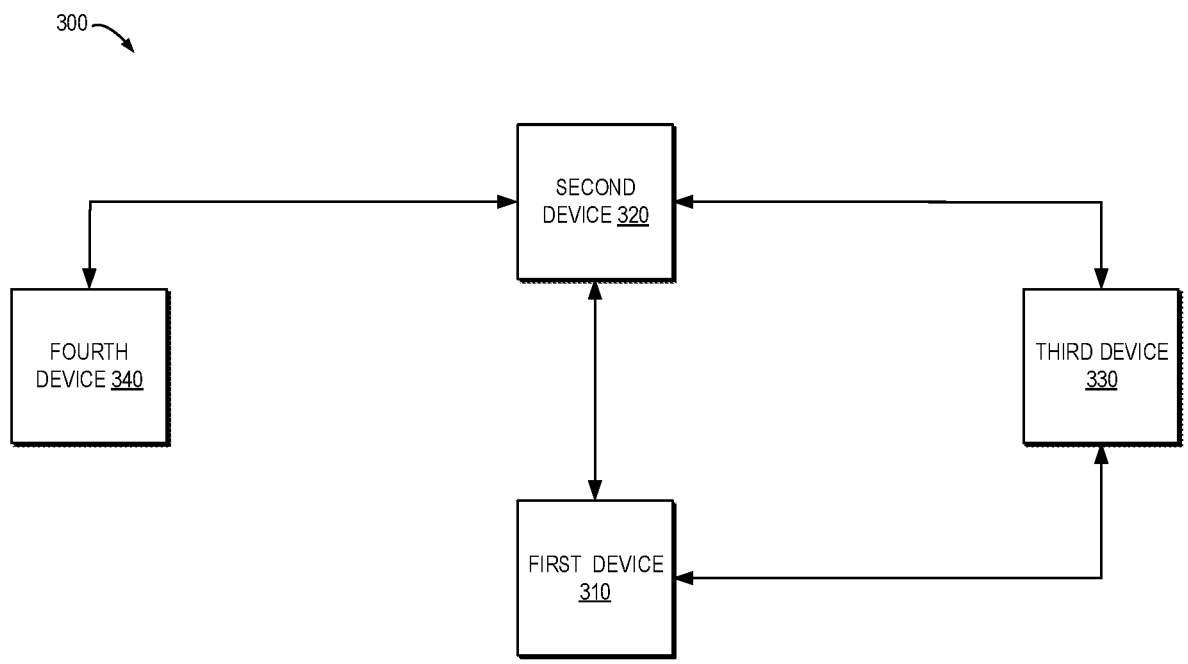
FIG. 3 illustrates an example communication environment in which example embodiments of the present disclosure can be implemented.

FIG. 3 illustrates a schematic diagram of a communication system 300 in which embodiments of the present disclosure can be implemented. The communication system 300, which is a part of a communication network, comprises a first device 310, a second device 320, a third device 330 and a fourth device 340. It is to be understood that the numbers of devices shown in FIG. 3 are given for the purpose of illustration without suggesting any limitations. In some example embodiments, the first device 310 may be an entity or a device which can work as an authorization policy management device. The second device 320 may be an authorization server. For example, the second device may be an entity or a device which can work as a NRF. Alternatively, the second device 320 may be an entity or a device which can works as a DCCF. The third device 330 may be an entity or a device which can work as a service producer. It should be noted that the third device 330 can be any suitable devices which can provide service and/or data. The fourth device 340 may be an entity or a device which can work as a service consumer. It should be noted that the fourth device 340 can be any suitable devices which can consume service and/or data. The service consumer may be an operator or a tenant. Alternatively, the service consumer may be a subscriber. The service consumer may be any suitable network functions.

Communications in the communication system 300 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 4:
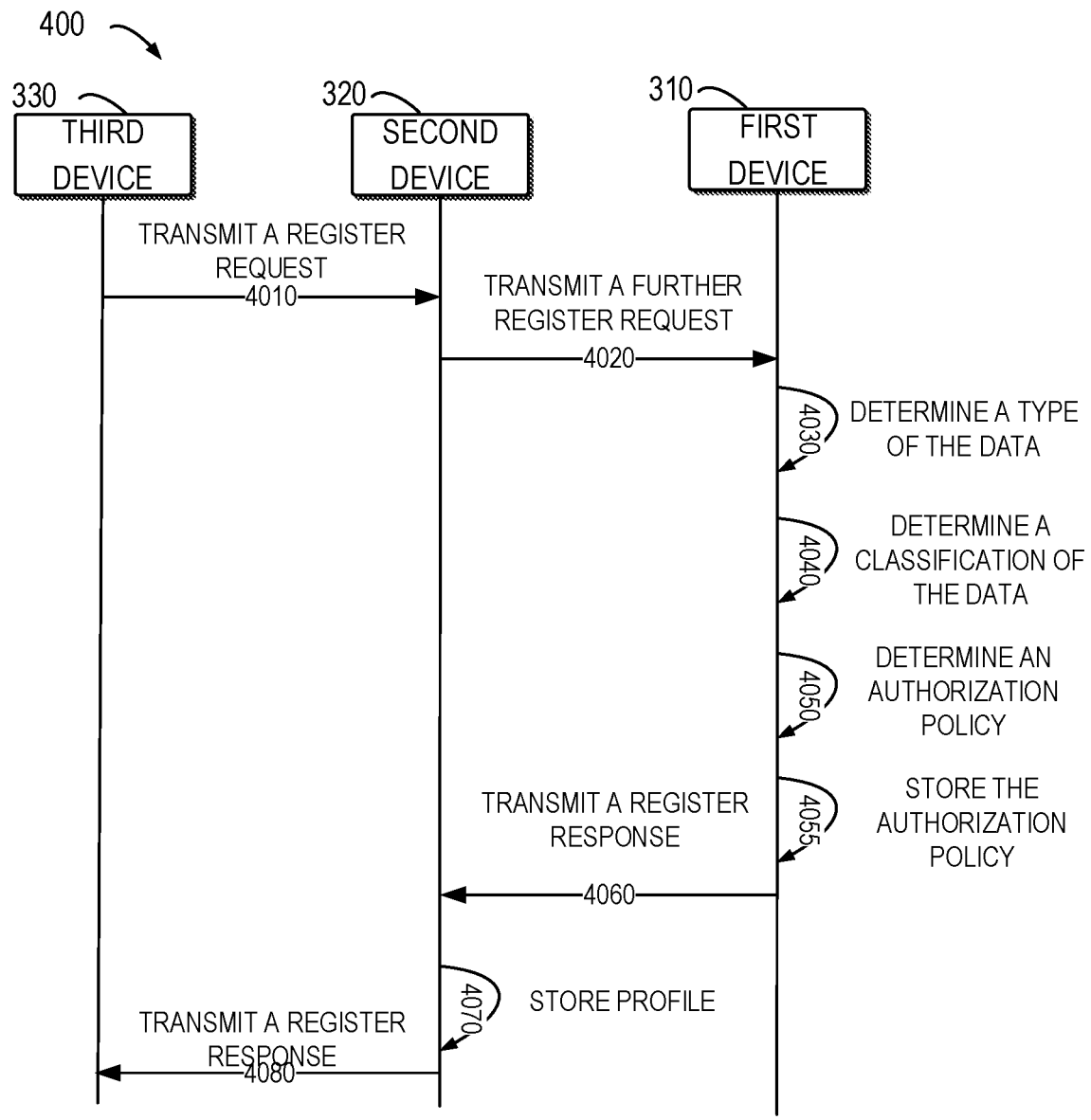
FIG. 4 illustrates a signaling flow for determining a preliminary authorization policy according to some example embodiments of the present disclosure.

Example embodiments of the present disclosure will be described in detail below with reference to the accompanying drawings. Reference is now made to FIG. 4, which illustrates a signaling flow 400 for determining a preliminary authorization policy according to example embodiments of the present disclosure. For the purpose of discussion, the signaling flow 400 will be described with reference to FIG. 3. The signaling flow 400 may involve the first device 310, the second device 320 and the third device 330. It should be noted that the signaling flow 400 is only an example not limitation.

In some example embodiments, the third device 330 may transmit 4010 a register request to the second device 320 in order to register the third device 330 with the second device 320. In some example embodiments, the third device 330 may register as a resource server in the second device. For example, the third device 330 may send a Nnrf_NFManagement_NFRegister request to the second device 320. In some example embodiments, the NF profile configuration data of the third device 320 may comprise additional scope information. For example, the additional scope information may indicate resources and actions (i.e., service operations) that are allowed on these resources for a NF service consumer (for example, the fourth device 340). These resources may be per NF type of the service consumer or per NF instance ID of the consumer.

The second device 320 may transmit 4020 a further register request to the first device 310 for registering with the first device 310. In some example embodiments, the further register request may comprise an identity of the third device 330. Alternatively or in addition, the further register request may comprise an expected scope of services. The further register request may also comprise expiration time of the data.

Alternatively, the third device 330 may directly transmit a register request to the first device 310 for registering with the first device 310. In some example embodiments, the register request may comprise an identity of the third device 330. Alternatively or in addition, the register request may comprise an expected scope of services. The register request may also comprise expiration time of the data.

The first device 310 may determine 4030 a type of the data provided by the third device 330. For example, the data type may be UE mobility. Alternatively or in addition, the data type may be UE communication. The data type may also be NF load. In other embodiments, the data type may be UE mobility prediction. In an example embodiment, the data type may be a slice key performance indicator (KPI). The data type may also be service data. It should be noted that the data types mentioned above are only examples and the data type can be any suitable types.

The first device 310 may determine 4040 a property of the data. For example, the first device 310 may classify the data to be analytics results. In some example embodiments, the property of the data may be signaling data. Alternatively or in addition, the data may be classified to be subscriber data. In other embodiments, the property of the data may be low-latency data. In example embodiments, the property of the data may low-priority data. Alternatively, the data may be classified to be confidential data. In some example embodiments, the property of data may be one of: user sensitive data, public data, business data, or business sensitive data. It should be noted that the properties of the data mentioned above are only examples and the properties of the data may be any suitable properties.

The first device 310 may determine 4050 an authorization policy for accessing the data. For example, the authorization policy may comprise a security requirement for accessing the data or the data service. Alternatively or in addition, the authorization policy may comprise a required security status for accessing the data or the data service. In other embodiments, the authorization policy may comprise a region requirement for accessing the data. It should be noted that the authorization policy may comprise any proper requirements for accessing the data provided by the third device 330. For example, the authorization policy may comprise security requirements on an operator or a tenant. The first device 310 may store 4055 the authorization policy locally. Alternatively, the authorization policy may be stored in a storage apparatus which is accessible to the first device 310.

The first device 310 may transmit 4060 a register response to the second device 320. The register response may indicate that the third device 330 has been registered with the first device 310 successfully. In some example embodiments, the register response may comprise the authorization policy. Alternatively, the register response may be sent to the third device 330 directly.

The second device 320 may store 4070 the NF profile configuration data of the third device 320. In other embodiment, the second device 320 may store the authorization policy.

The second device 320 may transmit 4080 a register response to the third device 330. The register response may indicate that the third device 330 has been registered with the second device 320 successfully. In some example embodiments, the register response may comprise the authorization policy.

The first device 310 may remove the authorization policy of the data. For example, the authorization policy may be deleted from the storage apparatus. In some example embodiments, if the third device 330 moves to another authorization sever (for example, a different NRF or DCCF), the first device 310 may delete the authorization policy of the data provide by the third device 330.

In this way, a new interface between the second device 320 and the first device 310 has been proposed. An initial authorization policy can be determined, which facilitates controlling the access to the data provides by the service producer.

Figure 5:
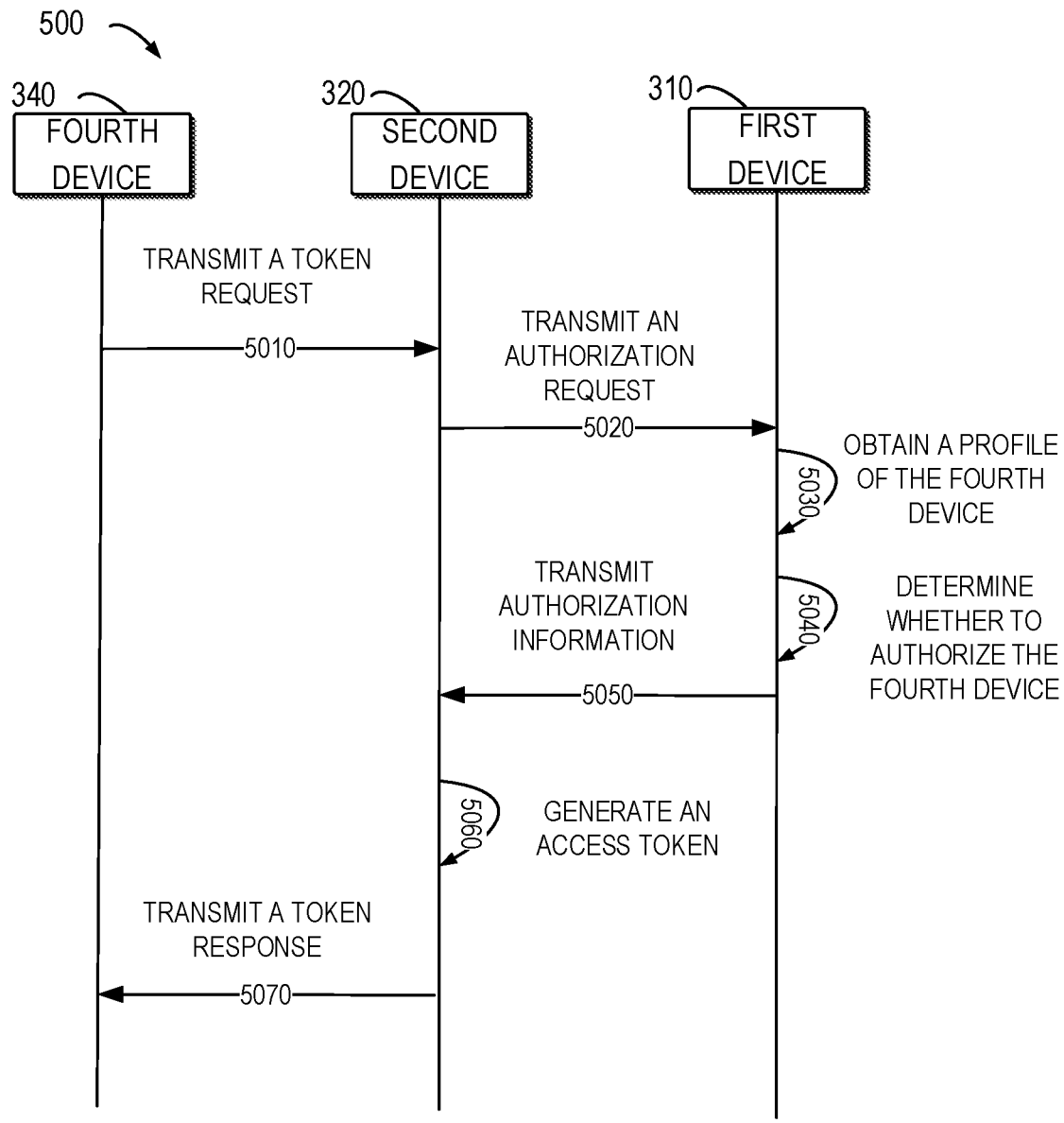
FIG. 5 illustrates a signaling flow for obtaining an access token according to some example embodiments of the present disclosure.

Example embodiments of the present disclosure will be described in detail below with reference to the accompanying drawings. Reference is now made to FIG. 5, which illustrates a signaling flow 500 for obtaining an access token according to example embodiments of the present disclosure. For the purpose of discussion, the signaling flow 500 will be described with reference to FIG. 3. The signaling flow 500 may involve the first device 310, the second device 320 and the fourth device 340.

The fourth device 340 may transmit 5010 a token request to the second device 320. Only as an example, the fourth device 340 may request an access token from the second device 320 using the Nnrf_AcessToken_Get request operation. In some example embodiments, the second device 320 and the fourth device 340 may be in the same Public Land Mobile Network (PLMN). In some example embodiments, the token request may comprise an identity of the fourth device 340. Alternatively or in addition, the token request may comprise requested scope, for example, the expected NF service names. Optionally, the token request may comprise additional scope information. For example, the additional scope information may comprise requested resources and requested actions (i.e., service operations) on the resources. Alternatively or in addition, the additional scope information may comprise NF type of the expected NF producer instance and NF consumer. In example embodiments, the token request may also comprise a list of Network Slice Selection Assistance Information (NSSAI). Alternatively, the token request may comprise a list of Network Slice Instance (NSI) identities (IDs) for the expected NF producer instance. In other embodiments, the token request may comprise the NF Set ID of the expected NF service producer instances.

The second device 320 may transmit 5020 an authorization request to the first device 310 for authorizing the fourth device 340 to access the data provided by the third device 330. The authorization request indicates an identity of the fourth device 340.

The first device 310 may obtain 5030 a profile of the fourth device 340 based on the identity of the fourth device 340. In some example embodiments, the profile may comprise the identity of the fourth device 340. Alternatively or in addition, a group identity of the fourth device 340 may be included in the profile. In other embodiments, the profile may comprise a context of the fourth device 340. Additionally, a security status of the fourth device 340 may be comprised in the profile. In some example embodiments, the profile may comprise data resource or requested actions. The first device 310 may obtain the profile from the authorization request. Alternatively, the first device 310 may obtain the profile from other devices which store the profile. For example, the profile can be obtained from the inventory, security analytics function. It should be noted that the profile may comprise other parameters related to the fourth device 340 not limited to the above examples.

The first device 310 may determine 5040 whether to authorize the fourth device 340 to access the data based on the authorization policy and the profile of the fourth device 340. Only as an example, the first device 310 may determine whether the context of the fourth device 340 satisfies a security requirement based on the authorization policy. If the context satisfies the security requirement, the fourth device 340 may be authorized to access the data. In some example embodiments, the first device 310 may update the authorization policy based on at least one of the profile of the fourth device 340 or a new requirement from the third device 330. Table 1 below shows examples for data access control. It should be noted that examples in Table 1 are only for the purpose of illustrations not limitations.

HPLMN, the decision is "allow". In other words, the first device 310 may authorize the fourth device 340 to access the data. Alternatively, if the fourth device 340 may request the data service "D4" and the profile indicates that the context of the fourth device 340 is HPLMN-unsecure, the decision is "deny". In other words, the first device 310 may not authorize the fourth device 340 to access the data.

The first device 310 may transmit 5050 authorization information which is generated based on the determination (5040) to the second device 320. For example, the authorization information may indicate that the fourth device 340 is denied to access the data. Alternatively, the authorization information may indicate that the fourth device 340 is allowed to access the data. In other embodiments, the authorization information may comprise the updated authorized policy or the initial authorized policy. It should be noted that the authorization information may comprise any suitable parameters not limited to the above examples.

The second device 320 may generate 5060 an access token. In some example embodiments, the access token may comprise one or more of: an NF instance ID of the second device 120, the NF instance ID of the third device 130, NF type of the third device 130, expected service names, scope, expiration time. In addition, the access token may also comprise allowed resources and allowed actions (i.e., service operations) on the resources. In example embodiments, the access token may also comprise a list of NSSAI. Alternatively, the access token may comprise a list of NSI IDs for the expected NF producer instance. In other embodiments, the access token may comprise the NF Set ID of the expected NF service producer instances. It should be noted that the access token may comprise any suitable parameters not limited to the above examples.

The second device 320 may transmit 5070 a token response to the fourth device 340. For example, the second device 320 may send the access token to the fourth device 340 in the Nnrf_AccessToken_Get response. If the fourth device 340 is authorized, the token response may comprise

TABLE 1

| | | | Data Object | | | | | | |
|---|---|---|---|---|---|---|---|---|---|
| | | | | Consumer | | | | | |
| Data ID | Data Type | Data Source | Data Classification/ Data Property | Consumer ID | Consumer Group | Consumer Role | Consumer Context | Decision | Notes |
| D1 | UE mobility | AMF | User Sensitive | Subscriber 1 | Subscriber Group 1 | Common User | Home PLMN (HPLMN) | Allow | Only allowed the data related to the subscriber |
| D2 | UE communication | SMF | User Sensitive | NWDAF-1 | NWDAF-mobility | Analytics NF | HPLMN | Allow | UE comm data can be accessed by relevant NWDAF, may on behalf of the NWDAF consumer |
| D3 | NF load | NRF | Public | NF-1 | AMF | Common NF | HPLMN | Allow | Public data can be accessed by any normal NF |
| D4 | NF load | NRF | Public | NF-1 | AMF | Common NF | HPLMN-unsecure | Deny | The NF is detected anomaly |
| D5 | UE mobility predictions | NWDAF | User Sensitive | Gov-1 | Government | VIP Customer | HPLMN | Allow | Government is allowed to access UE mobility data in specific period |
| D6 | Slice KPI | OAM | Business Sensitive | BMW | Vertical-1 | Vertical Customer | HPLMN | Allow | After check ownership of SNSSAI |
| D7 | Service Data | AF | Confidential | Subscriver 2 | Subscriber Group 1 | Common User | Out of HPLMN | Allow | The user is not in secure region |

In some example embodiments, the default decision may be deny. In some example embodiments, if the fourth device 340 may request the data service "D3" and the profile indicates that the context of the fourth device 340 is the generated token. If the fourth device 340 is denied, the second device 320 may transmit the token response indicating an error response. It should be noted that the access token may be transmitted in any suitable signaling.

In some example embodiments, the fourth device 340 may use the access token immediately. Alternatively, the access token may be used later. For example, the fourth device 340 may store the access token and the access token may be reused during valid time of the access token. In this way, the access to the data can be adjusted based on latest conditions of the service consumer, which improves the security of the data.

Figure 6:
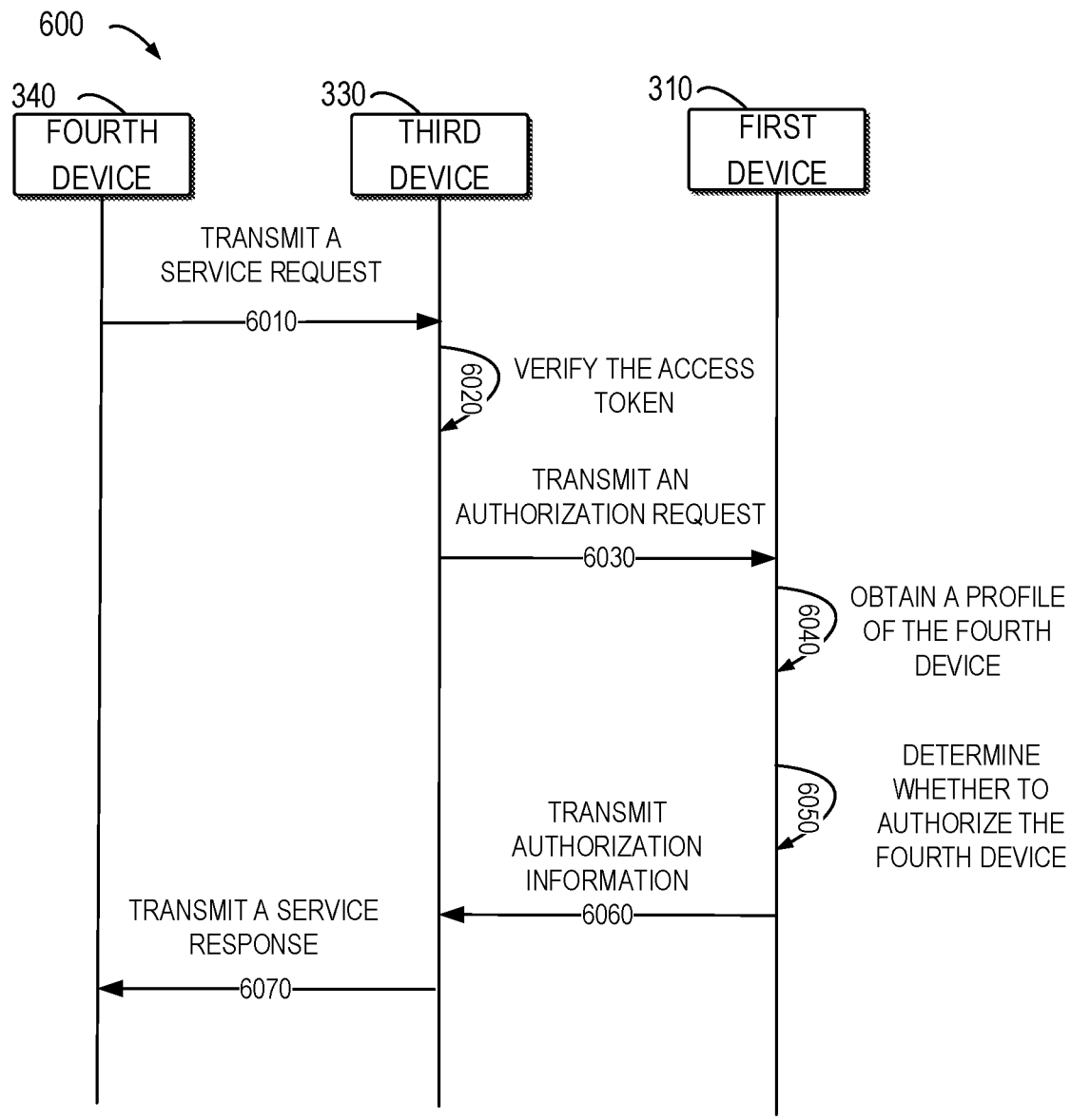
FIG. 6 illustrates a signaling flow for controlling access to the data according to some example embodiments of the present disclosure.

Example embodiments of the present disclosure will be described in detail below with reference to the accompanying drawings. Reference is now made to FIG. 6, which illustrates a signaling flow 600 for controlling access to the data according to example embodiments of the present disclosure. For the purpose of discussion, the signaling flow 600 will be described with reference to FIG. 3. The signaling flow 600 may involve the first device 310, the third device 330 and the fourth device 340.

The fourth device 340 may transmit 6010 a service request to the third device 330. The service request may comprise the access token obtained from the second device 320.

The third device 330 may verify 6020 the access token. For example, the third device 330 may ensure the integrity of the access token by verifying the signature using NRF public key. Alternatively, the third device 330 may verify the access token by checking medium access control (MAC) value using the shared secret. In other embodiments, the access token may be sent to the first device 310 and the first device 310 may verify the access token.

The third device 330 may transmit 6030 an authorization request to the first device 310 for authorizing the fourth device 340 to access the data provided by the third device 330. The authorization request indicates an identity of the fourth device 340. For example, if the access token is verified, the authorization request may be sent.

The first device 310 may obtain 6040 a profile of the fourth device 340 based on the identity of the fourth device 340. In some example embodiments, the profile may comprise the identity of the fourth device 340. Alternatively or in addition, a group identity of the fourth device 340 may be included in the profile. In other embodiments, the profile may comprise a context of the fourth device 340. Additionally, a security status of the fourth device 340 may be comprised in the profile. In some example embodiments, the profile may comprise data resource or requested actions. The first device 310 may obtain the current profile from the authorization request. Alternatively, the first device 310 may obtain the current profile from other devices which store the profile. For example, the profile can be obtained from the inventory, security analytics function. It should be noted that the profile may comprise other parameters related to the fourth device 340 not limited to the above examples.

The first device 310 may determine 6050 whether to authorize the fourth device 340 to access the data based on the authorization policy and the current profile of the fourth device 340. Only as an example, the first device 310 may determine whether the context of the fourth device 340 satisfies a security requirement based on the authorization policy. If the context satisfies the security requirement, the fourth device 340 may be authorized to access the data. In some example embodiments, the first device 310 may update the authorization policy based on the current profile of the fourth device 340 and/or a new requirement from the third device 330.

Only as an example, during the procedure of obtaining the access token, if the fourth device 340 may request the data service "D3" and the profile indicates that the context of the fourth device 340 is HPLMN, the decision is "allow". In other words, the fourth device 340 may obtain the access token from the second device 120. During the valid time of the access token, the fourth device 340 may transmit the service request with the access token and the access token may be verified successfully. The third device 330 may transmit the authorization request to the first device 310. The first device 310 may obtain the current or latest profile of the fourth device 340. For example, if the current profile indicates that the context of the fourth device is HPLMN, the first device 310 may determine that the fourth device 340 is authorized to access the data. Alternatively, if the current profile indicates that the context of the fourth device is changed to be HPLMN-unsecure, the first device 310 may determine that the fourth device 340 cannot be authorized to access the data even though the access token has been verified. In this way, the access to the data can be controlled dynamically. Any changes of the consumer can be considered when controlling the access to the data, thereby improving security of the data.

The first device 310 may transmit 6060 authorization information which is generated based on the determination (6050) to the third device 330. For example, the authorization information may indicate that the fourth device 340 is denied to access the data. Alternatively, the authorization information may indicate that the fourth device 340 is allowed to access the data. In other embodiments, the authorization information may comprise the updated authorized policy or the initial authorized policy. It should be noted that the authorization information may comprise any suitable parameters not limited to the above examples.

The third device 330 may transmit 6070 a service response to the fourth device 340. If the authorization information indicates that the fourth device 340 is allowed, the service response may indicate that the access to the data is allowed. Alternatively, the service response may indicate that the access to the data is denied if the authorization information indicates that the fourth device 340 is denied.

Figure 7:
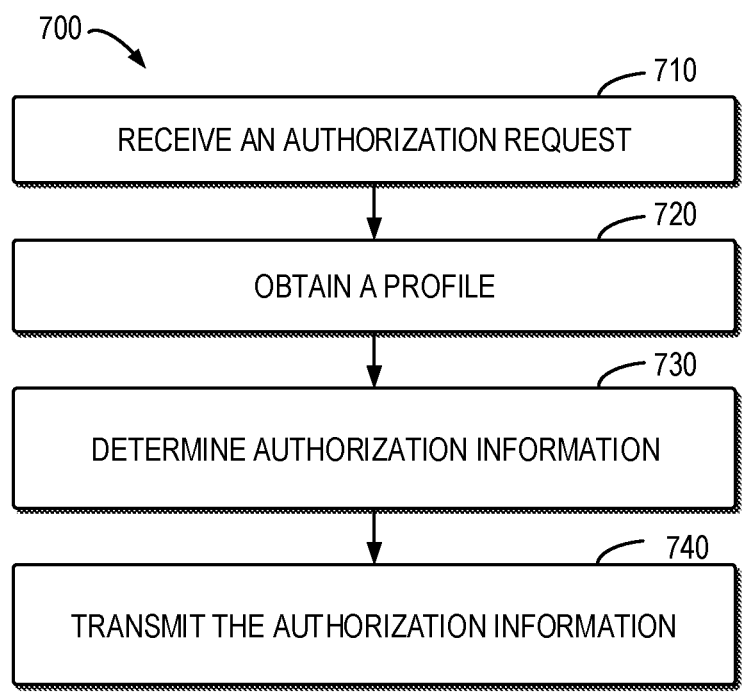
FIG. 7 illustrates a flowchart of a method implemented at a first apparatus according to some example embodiments of the present disclosure.

FIG. 7 shows a flowchart of an example method 700 implemented at a first device 310 in accordance with some example embodiments of the present disclosure. For the purpose of discussion, the method 700 will be described from the perspective of the first device 310.

In some example embodiments, the third device 330 may need to register with the first device 310. For example, the first device 310 may directly receive a register request to the first device 310 for registering with the first device 310. In some example embodiments, the register request may comprise an identity of the third device 330. Alternatively or in addition, the register request may comprise an expected scope of services. The register request may also comprise expiration time of the data.

Alternatively, the first device 310 may receive a further register request from the second device 320. In some example embodiments, the further register request may comprise an identity of the third device 330. Alternatively or in addition, the further register request may comprise an expected scope of services. The further register request may also comprise expiration time of the data.

In some example embodiments, the first device 310 may determine a type of the data provided by the third device 330. For example, the data type may be UE mobility. Alternatively or in addition, the data type may be UE communication. The data type may also be NF load. In other embodiments, the data type may be UE mobility prediction. In an example embodiment, the data type may be a slice key performance indicator (KPI). The data type may also be service data. It should be noted that the data types mentioned above are only examples and the data type can be any suitable types.

In some example embodiments, the first device 310 may determine a property of the data. For example, the first device 310 may classify the data to be analytics results. In some example embodiments, the property of the data may be signaling data. Alternatively or in addition, the data may be classified to be subscriber data. In other embodiments, the property of the data may be low-latency data. In example embodiments, the property of the data may low-priority data. Alternatively, the data may be classified to be confidential data. In some example embodiments, the property of data may be one of: user sensitive data, public data, business data, or business sensitive data. It should be noted that the properties of the data mentioned above are only examples and the properties of the data may be any suitable properties.

The first device 310 may determine an authorization policy for accessing the data. For example, the authorization policy may comprise a security requirement for accessing the data. Alternatively or in addition, the authorization policy may comprise a required security status for accessing the data. In other embodiments, the authorization policy may comprise a region requirement for accessing the data. It should be noted that the authorization policy may comprise any proper requirements for accessing the data provided by the third device 330. For example, the authorization policy may comprise security requirements on an operator or a tenant. The first device 310 may store the authorization policy locally. Alternatively, the authorization policy may be stored in a storage apparatus which is accessible to the first device 310.

The first device 310 may transmit a register response to the second device 320. The register response may indicate that the third device 330 has been registered with the first device 310 successfully. In some example embodiments, the register response may comprise the authorization policy. Alternatively, the register response may be sent to the third device 330 directly.

At block 710, the first device 310 receives an authorization request from the second device 320 or the third device 330. The authorization request may be used for authorizing the fourth device 340 to access at least one of: a data service or data provided by the third device 330. The authorization request indicates an identity of the fourth device 340.

At block 720, the first device 310 obtains a profile of the fourth device 340 based on the identity of the fourth device 340. In some example embodiments, the profile may comprise the identity of the fourth device 340. Alternatively or in addition, a group identity of the fourth device 340 may be included in the profile. In other embodiments, the profile may comprise a context of the fourth device 340. Additionally, a security status of the fourth device 340 may be comprised in the profile. In some example embodiments, the profile may comprise data resource or requested actions. The first device 310 may obtain the profile from the authorization request. Alternatively, the first device 310 may obtain the profile from other devices which store the profile. For example, the profile can be obtained from the inventory, security analytics function. It should be noted that the profile may comprise other parameters related to the fourth device 340 not limited to the above examples.

At block 730, the first device 310 determines authorization information of the fourth device 340 based on the profile of the fourth device 340 and an authorization policy of the data service of the data. In some example embodiments, if the authorization request is received from the second device 320, the first device 310 may determine one or more types of data related to the data service which is accessible to the fourth device 340. Only as an example, the second device 320 may transmit the authorization request for the data service A and the data service A may comprise a data type A1, a data type A2, a data type A3 and a data type A4. The first device 310 may determine that the second device 320 can access the data type A1 and the data type A3. The authorization information may indicate the data type A1 and the data type A3. It should be noted that the data service can be any suitable data services.

In some example embodiments, if the authorization request is received from the third device 330, the first device 310 may determine the authorization information of the fourth device 340 is to be authorized to access the data provided by the third device 330. Only as an example, the first device 310 may determine whether the context of the fourth device 340 satisfies a security requirement based on the authorization policy. If the context satisfies the security requirement, the fourth device 340 may be authorized to access the data. In some example embodiments, the first device 310 may update the authorization policy based on the profile of the fourth device 340 and/or a new requirement from the third device 330.

In some example embodiments, the default decision may be denied. In some example embodiments, if the fourth device 340 may request the data service "D3" and the profile indicates that the context of the fourth device 340 is HPLMN, the decision is "allow". In other words, the first device 310 may authorize the fourth device 340 to access the data. Alternatively, if the fourth device 340 may request the data service "D4" and the profile indicates that the context of the fourth device 340 is HPLMN-unsecure, the decision is "deny". In other words, the first device 310 may not authorize the fourth device 340 to access the data.

At block 740, the first device 310 transmits authorization information which is generated based on the determination to the second device 320. For example, the authorization information may indicate that the fourth device 340 is denied to access the data. Alternatively, the authorization information may indicate that the fourth device 340 is allowed to access the data. In other embodiments, the authorization information may comprise the updated authorized policy or the initial authorized policy. It should be noted that the authorization information may comprise any suitable parameters not limited to the above examples.

In some example embodiments, the first device 310 may receive a request for access control information of the data from the third device 330. The access control information may comprise the authorization policy. Alternatively or in addition, the access control information may comprise other parameters for controlling the access to the data, for example, a required context for accessing the data. The first device 310 may transmit the access control information to the third device 330 based on the request.

In other embodiments, the first device 310 may receive an update request from the third device 330. The update request may be used for updating the authorization policy. For example, the third device 330 may transmit one or more new requirements for accessing the data to the first device 310. The first device 310 may update the authorization policy based on the update request and the new requirements.

In some example embodiments, the first device 310 may remove the authorization policy. For example, the authorization policy may be deleted from the storage apparatus. In some example embodiments, if the third device 330 moves to another authorization sever (for example, a different NRF or DCCF), the first device 310 may delete the authorization policy of the data provide by the third device 330. In other example embodiments, the first device 310 may receive a remove request for removing the authorization policy.

Figure 8:
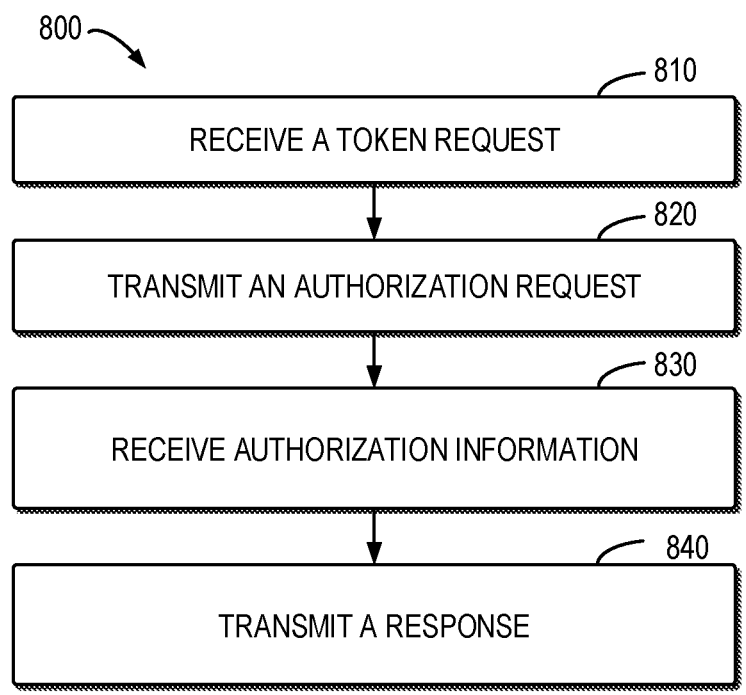
FIG. 8 illustrates a flowchart of a method implemented at a second apparatus according to some other example embodiments of the present disclosure.

FIG. 8 shows a flowchart of an example method 800 implemented at a second device 320 in accordance with some example embodiments of the present disclosure. For the purpose of discussion, the method 800 will be described from the perspective of the second device 320. It should be noted that the dashed blocks are optional.

In some example embodiments, the second device 320 may receive a register request from the third device 330 in order to register the third device 330 with the second device 320. In some example embodiments, the third device 330 may register as a resource server in the second device 320. For example, the second device 320 may receive a Nnrf_NF-Management_NFRegister request from the third device 330. In some example embodiments, the NF profile configuration data of the third device 320 may comprise additional scope information. For example, the additional scope information may indicate resources and actions (i.e., service operations) that are allowed on these resources for a NF service consumer (for example, the fourth device 340). These resources may be per NF type of the service consumer or per NF instance ID of the consumer.

In some example embodiments, the second device 320 may transmit a further register request to the first device 310 for registering the third device 330 with the first device 310. In some example embodiments, the further register request may at least comprise an identity of the third device 330. Alternatively or in addition, the further register request may comprise an expected scope of services. The further register request may also comprise expiration time of the data.

The second device 320 may receive a register response from the first device 310. The register response may indicate that the third device 330 has been registered with the first device 310 successfully. In some example embodiments, the register response may comprise the authorization policy. Alternatively, the register response may be sent to the third device 330 directly.

In some example embodiments, the second device 320 may store the NF profile configuration data of the third device 320. In other embodiment, the second device 320 may store the authorization policy. The second device 320 may also transmit a register response to the third device 330. The register response may indicate that the third device 330 has been registered with the second device 320 successfully. In some example embodiments, the register response may comprise the authorization policy.

At block 810, the second device 320 receives a token request for accessing a data service from the fourth device 340. Only as an example, the fourth device 340 may request an access token from the second device 320 using the Nnrf_AcessToken_Get request operation. In some example embodiments, the second device 320 and the fourth device 340 may be in the same Public Land Mobile Network (PLMN). In some example embodiments, the token request may comprise an identity of the fourth device 340. Alternatively or in addition, the token request may comprise requested scope, for example, the expected NF service names. Optionally, the token request may comprise additional scope information. For example, the additional scope information may comprise requested resources and requested actions (i.e., service operations) on the resources. Alternatively or in addition, the additional scope information may comprise NF type of the expected NF producer instance and NF consumer. In example embodiments, the token request may also comprise a list of Network Slice Selection Assistance Information (NSSAI). Alternatively, the token request may comprise a list of Network Slice Instance (NSI) identities (IDs) for the expected NF producer instance. In other embodiments, the token request may comprise the NF Set ID of the expected NF service producer instances.

At block 820, the second device 320 transmits an authorization request to the first device 310 for authorizing the fourth device 340 to access the data service provided by the third device 330. The authorization request indicates an identity of the fourth device 340.

At block 830, the second device 320 receives authorization information which is generated based on the determination (5040) from the first device 310. For example, the authorization information may indicate that the fourth device 340 is denied to access the data. Alternatively, the authorization information may indicate that the fourth device 340 is allowed to access the data. In other embodiments, the authorization information may comprise the updated authorized policy or the initial authorized policy. It should be noted that the authorization information may comprise any suitable parameters not limited to the above examples.

In some example embodiments, the second device 320 may generate an access token. In some example embodiments, the access token may comprise one or more of: an NF instance ID of the second device 120, the NF instance ID of the third device 130, NF type of the third device 130, expected service names, scope, expiration time. In addition, the access token may also comprise allowed resources and allowed actions (i.e., service operations) on the resources. In example embodiments, the access token may also comprise a list of NSSAI. Alternatively, the access token may comprise a list of NSI IDs for the expected NF producer instance. In other embodiments, the access token may comprise the NF Set ID of the expected NF service producer instances. It should be noted that the access token may comprise any suitable parameters not limited to the above examples.

At block 840, the second device 320 may transmit 5070 a token response to the fourth device 340. For example, the second device 320 may send the access token to the fourth device 340 in the Nnrf_AccessToken_Get response. If the fourth device 340 is denied, the second device 320 may reply the token request based on an error response. It should be noted that the access token may be transmitted in any suitable signaling.

Figure 9:
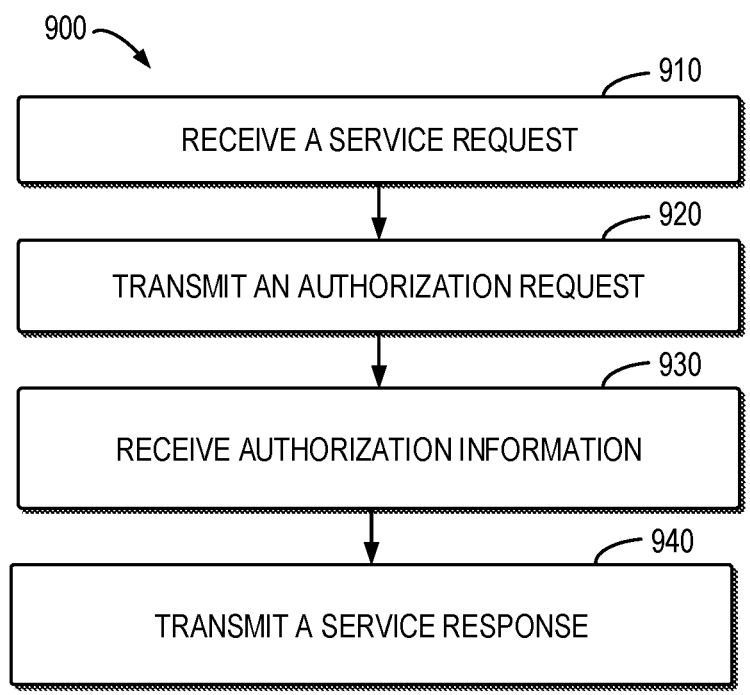
FIG. 9 illustrates a flowchart of a method implemented at a third apparatus according to some other example embodiments of the present disclosure.

FIG. 9 shows a flowchart of an example method 900 implemented at a third device 330 in accordance with some example embodiments of the present disclosure. For the purpose of discussion, the method 900 will be described from the perspective of the third device 330. It should be noted that the dashed blocks are optional.

At block 910, the third device 330 receives a service request from the fourth device 340. The service request may comprise a token for accessing at least one of: a data service or data provided by the third device.

In some example embodiments, the third device 330 may verify the access token. For example, the third device 330 may ensure the integrity of the access token by verifying the signature using NRF public key. Alternatively, the third device 330 may verify the access token by checking medium access control (MAC) value using the shared secret.

At block 920, the third device 330 transmits an authorization request to the first device 310 for authorizing the fourth device 340 to access the data service or the data provided by the third device 330. The authorization request indicates an identity of the fourth device 340. For example, if the access token is verified, the authorization request may be sent.

At block 930, the third device 330 receives the authorization information which is generated based on the determination from the first device 310. For example, the authorization information may indicate that the fourth device 340 is denied to access the data. Alternatively, the authorization information may indicate that the fourth device 340 is allowed to access the data. In other embodiments, the authorization information may comprise the updated authorized policy or the initial authorized policy. It should be noted that the authorization information may comprise any suitable parameters not limited to the above examples.

At block 940, the third device 330 transmits a service response to the fourth device 340. If the authorization information indicates that the fourth device 340 is allowed, the service response may indicate that the access to the data is allowed. Alternatively, the service response may indicate that the access to the data is denied if the authorization information indicates that the fourth device 340 is denied.

In some example embodiments, the third device 330 may transmit a register request to the second device 320 in order to register with the second device 320. In some example embodiments, the third device 330 may register as a resource server in the second device. For example, the third device 330 may send a Nnrf_NFManagement_NFRegister request to the second device 320. In some example embodiments, the NF profile configuration data of the third device 320 may comprise additional scope information. For example, the additional scope information may indicate resources and actions (i.e., service operations) that are allowed on these resources for a NF service consumer (for example, the fourth device 340). These resources may be per NF type of the service consumer or per NF instance ID of the consumer.

Alternatively, the third device 330 may directly transmit a register request to the first device 310 for registering with the first device 310. In some example embodiments, the register request may comprise an identity of the third device 330. Alternatively or in addition, the register request may comprise an expected scope of services. The register request may also comprise expiration time of the data.

In some example embodiments, the third device 330 may transmit a request for access control information of the data to the first device 310. The third device 330 may receive the access control information from the first device 310. The access control information may comprise the authorization policy. Alternatively or in addition, the access control information may comprise other parameters for controlling the access to the data, for example, a required context for accessing the data.

In other embodiments, the third device 330 may transmit an update request to the first device 310. The update request may be used for updating the authorization policy. For example, the third device 330 may transmit one or more new requirements for accessing the data to the first device 310. The first device 310 may update the authorization policy based on the update request and the new requirements. In some example embodiments, the third device 330 may transmit a remove request to the first device 310 for removing the authorization policy from the first device 310.

In some example embodiments, a first apparatus capable of performing any of the method 700 (for example, the first device 310) may comprise means for performing the respective operations of the method 700. The means may be implemented in any suitable form. For example, the means may be implemented in a circuitry or software module. The first apparatus may be implemented as or included in the first device 310. In some example embodiments, the means may comprise at least one processor and at least one memory including computer program code. The at least one memory and computer program code are configured to, with the at least one processor, cause performance of the apparatus.

In some example embodiments, the apparatus comprises means for receiving, at a first device and from a second device or a third device, an authorization request for authorizing a fourth device to access at least one of: a data service or data provided by the third device, the authorization request at least indicating an identity of the fourth device; means for obtaining a profile of the fourth device based on the identity of the fourth device; means for determining, based on the profile of the fourth device and an authorization policy of the data service or the data, authorization information of the fourth device; and means for transmitting the authorization information to the second device or the third device.

In some example embodiments, the apparatus further comprises means for updating the authorization policy of the data based on at least one of: the profile of the fourth device or a new requirement from the third device.

In some example embodiments, the apparatus further comprises at least one of: means for receiving, from the third device, a request for access control information of the data, the access control information at least comprising the authorization policy; or means for receiving, from the third device, an update request for updating the authorization policy.

In some example embodiments, the apparatus further comprises means for removing the authorization policy of the data.

In some example embodiments, the profile of the fourth device comprises at least one of: a group identity of the fourth device, a role of the fourth device, or a context of the fourth device.

In some example embodiments, the authorization policy comprises at least one of: a security requirement for accessing the data service or the data, a service type of the data, or a required region for accessing the data service or the data.

In some example embodiments, the authorization request is received from the second device and the means for determining the authorization information comprises means for determining at least one type of data related to the data service which is accessible to the fourth device.

In some example embodiments, the authorization request is received from the third device and the means for determining the authorization information comprises: means for determining the authorization information of the fourth device indicating whether the fourth device is to be authorized to access the data provided by the third device; or means for determining whether of a context of the fourth device satisfies a security requirement for accessing the data based on the authorization policy; and means for in accordance with a determination that the context of the fourth device satisfies the security requirement, determining the fourth device is authorized to access the data.

In some example embodiments, the apparatus further comprises means for receiving, from the second device or the third device, a register request for registering the third device with the first device, the register request comprising an identity of the third device; means for determining a type of the data to be provided by the third device; means for determining a property of the data based on the type of the data; and means for determining the authorization policy of the data based on the property of the data.

In some example embodiments, the apparatus further comprises means for transmitting a register response to the second device or the third device.

In some example embodiments, a second first apparatus capable of performing any of the method 800 (for example, the second device 320) may comprise means for performing the respective operations of the method 800. The means may be implemented in any suitable form. For example, the means may be implemented in a circuitry or software module. The first apparatus may be implemented as or included in the second device 320. In some example embodiments, the means may comprise at least one processor and at least one memory including computer program code. The at least one memory and computer program code are configured to, with the at least one processor, cause performance of the apparatus.

In some example embodiments, the apparatus comprises means for receiving, at a second device and from a fourth device, a token request for accessing a data service; means for transmitting to a first device an authorization request for authorizing the fourth device to access the data service, the authorization request at least indicating an identity of the fourth device; means for receiving from the first device authorization information of the fourth device; and means for transmitting a response to the token request to the fourth device.

In some example embodiments, the apparatus further comprises means for receiving from the third device a register request device for registering with the second device; means for transmitting to the first device a further register request for registering the third device with the first device; means for receiving from the first device a response to the further register request, the response comprising an authorization policy of the data; and means for transmitting to the third device a register response to the register request.

In some example embodiments, a third first apparatus capable of performing any of the method 900 (for example, the third device 330) may comprise means for performing the respective operations of the method 900. The means may be implemented in any suitable form. For example, the means may be implemented in a circuitry or software module. The first apparatus may be implemented as or included in the second device 320. In some example embodiments, the means may comprise at least one processor and at least one memory including computer program code. The at least one memory and computer program code are configured to, with the at least one processor, cause performance of the apparatus.

In some example embodiments, the apparatus comprises means for receiving, at a third device and from a fourth device, a service request comprising a token for accessing at least one of: a data service or data provided by the third device; means for transmitting to a first device an authorization request for authorizing the fourth device to access the data service or the data, the authorization request at least indicating an identity of the fourth device; means for receiving from the first device authorization information of the fourth device; and means for transmitting to the fourth device a service response generated based on the authorization information.

In some example embodiments, the apparatus further comprises means for transmitting a register request device to the first device or a second device; and means for receiving from the first device or the second device a response to the register request.

In some example embodiments, the apparatus further comprises at least one of: means for transmitting, to the first device, a request for access control information of the data, the access control information at least comprising the authorization policy; means for transmitting, to the first device, an update request for updating the authorization policy; or means for transmitting, to the first device, a remove request for removing the authorization policy.

Figure 10:
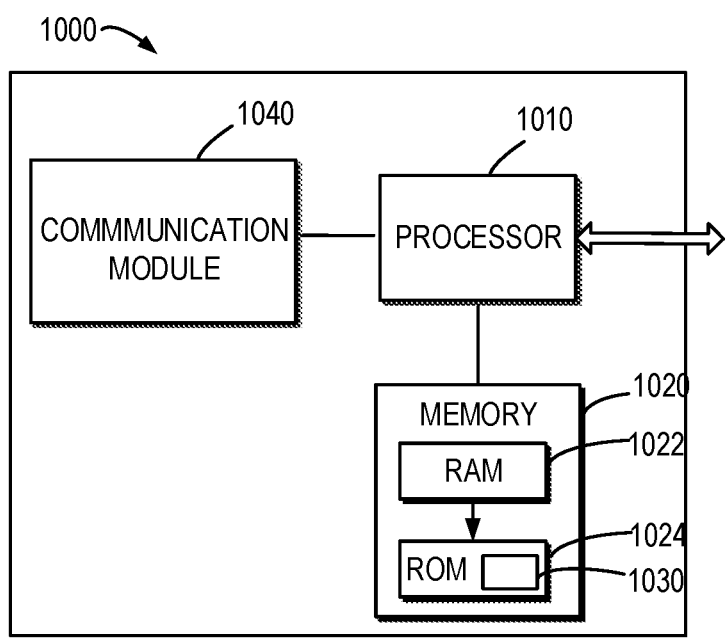
FIG. 10 illustrates a simplified block diagram of an apparatus that is suitable for implementing example embodiments of the present disclosure.

FIG. 10 is a simplified block diagram of a device 1000 that is suitable for implementing example embodiments of the present disclosure. The device 1000 may be provided to implement a communication device, for example, the first device 310, the second device 320, or the third device 330 as shown in FIG. 3. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has one or more communication interfaces to facilitate communication with one or more other modules or devices. The communication interfaces may represent any interface that is necessary for communication with other network elements. In some example embodiments, the communication module 540 may include at least one antenna.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the memory, e.g., ROM 1024. The processor 1010 may perform any suitable actions and processing by loading the program 1030 into the RAM 1022.

Example embodiments of the present disclosure may be implemented by means of the program 1030 so that the device 1000 may perform any process of the disclosure as discussed with reference to FIGS. 3 to 9. The example embodiments of the present disclosure may also be implemented by hardware or by a combination of software and hardware.

Figure 11:
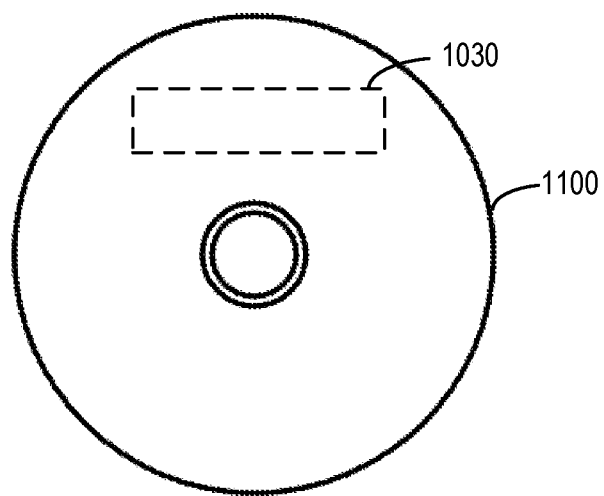
FIG. 11 illustrates a block diagram of an example computer readable medium in accordance with some example embodiments of the present disclosure.

In some example embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and other magnetic storage and/or optical storage. FIG. 11 shows an example of the computer readable medium 1100 in form of an optical storage disk. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program codes;
   the at least one memory and the computer program codes are configured to, with the at least one processor, cause the first device, which is an authorization policy management entity, to:
      receive, from a second device which is an authorization server or a third device which is a service producer, an authorization request for authorizing a fourth device which is a service consumer to access at least a data service and data provided by the third device, the authorization request at least indicating an identity of the fourth device;
      obtain a profile of the fourth device based on the identity of the fourth device, wherein the profile of the fourth device comprises at least:
         a group identity of the fourth device,
         a role of the fourth device, and
         a context of the fourth device;
      receive, from the second device or the third device, a register request for registering the third device with the first device, the register request comprising an identity of the third device;
      determine a type of the data to be provided by the third device;
      determine a property of the data based on the type of the data;
      determine an authorization policy of the data based on the property of the data, wherein the authorization policy comprises at least:
         a security requirement for accessing the data service or the data,
         a service type of the data, and
         a required region for accessing the data service or the data;
      transmit a register response to the second device or the third device;

determine, based on the profile of the fourth device and the authorization policy of the data service or the data, authorization information of the fourth device,
wherein when the authorization request is received from the second device, the first device is caused to determine the authorization information by:
determining at least one type of data related to the data service which is accessible to the fourth device,
wherein when the authorization request is received from the third device, the first device is caused to determine the authorization information by:
determining the authorization information of the fourth device indicating whether the fourth device is to be authorized to access the data provided by the third device; or
determining whether a context of the fourth device satisfies a security requirement for accessing the data based on the authorization policy; and
in accordance with a determination that the context of the fourth device satisfies the security requirement, determining the fourth device is authorized to access the data;
based on the authorization information, authorize the fourth device to access the data;
transmit the authorization information to the second device or the third device;
receive, from the third device, a request for access control information of the data, the access control information at least comprising the authorization policy;
receive, from the third device, an update request for updating the authorization policy; and
update the authorization policy of the data based on the profile of the fourth device and a new requirement from the third device.

\* \* \* \* \*